(12) United States Patent
Shan et al.

(10) Patent No.: US 6,532,801 B1
(45) Date of Patent: Mar. 18, 2003

(54) PORTABLE APPARATUS AND METHOD FOR TRACING A GAS LEAK

(75) Inventors: Qing Shan, Loughborough (GB); Russell Desmond Pride, Great Dalby (GB)

(73) Assignee: Lattice Intellectual Property Ltd, London (GB)

( * ) Notice: Subject to any disclaimer, the term of this patent is extended or adjusted under 35 U.S.C. 154(b) by 0 days.

(21) Appl. No.: 09/926,627

(22) PCT Filed: May 24, 2000

(86) PCT No.: PCT/GB00/01949

§ 371 (c)(1),
(2), (4) Date: Nov. 27, 2001

(87) PCT Pub. No.: WO00/73761

PCT Pub. Date: Dec. 7, 2000

(30) Foreign Application Priority Data

May 27, 1999 (GB) .............................................. 9912332

(51) Int. Cl.[7] .......................... G01M 3/00; G01M 3/04; G01M 3/26; G01N 35/00; F17D 5/02
(52) U.S. Cl. .......................... 73/40.7; 73/40; 73/170.04
(58) Field of Search ................ 73/40.7, 40, 170.04, 73/170.01, 25.02, 25.03, 23.2

(56) References Cited

U.S. PATENT DOCUMENTS

| | | | | |
|---|---|---|---|---|
| 2,947,166 A | * | 8/1960 | Palmer et al. ................ 73/407 |
| 3,020,746 A | * | 2/1962 | Minter ............................ 73/27 |
| 3,311,455 A | * | 3/1967 | Robinson ..................... 23/255 |
| 3,397,574 A | * | 8/1968 | Soulant ........................ 73/170 |
| 4,159,638 A | * | 7/1979 | Potter ....................... 73/61.1 R |
| 4,408,488 A | * | 10/1983 | Marshall ................... 73/170 A |
| 4,423,626 A | * | 1/1984 | Herschede .................... 73/188 |
| 4,584,867 A | * | 4/1986 | Forster ........................... 73/23 |
| 4,983,913 A | * | 1/1991 | Krause et al. .............. 324/204 |
| 5,012,669 A | * | 5/1991 | Meyer ........................ 73/25.02 |
| 5,297,421 A | * | 3/1994 | Hosonuma et al. ............ 73/40 |
| 5,604,299 A | * | 2/1997 | Cobb ........................ 73/31.02 |
| 6,246,227 B1 | * | 6/2001 | Hobby et al. ............... 324/204 |

FOREIGN PATENT DOCUMENTS

| | | |
|---|---|---|
| DE | 41 27 543 | 2/1993 |
| EP | 0 503 841 | 9/1992 |
| JP | 7-12671 | 1/1995 |
| JP | 7-260618 | 10/1995 |

\* cited by examiner

*Primary Examiner*—Hezron Williams
*Assistant Examiner*—David J. Wiggins
(74) *Attorney, Agent, or Firm*—Oblon, Spivak, McClelland, Maier & Neustadt, P.C.

(57) ABSTRACT

A method and apparatus for identifying the location of a gas leak source. The apparatus includes a gas detector for detecting the presence of gas and a wind direction indicator. The method traces a gas leak source location using the apparatus including the gas detector, arranged to detect the presence or absence of a gas, and the wind direction indicator.

27 Claims, 4 Drawing Sheets

PORTABLE APPARATUS AND METHOD FOR TRACING A GAS LEAK

FIELD OF THE INVENTION

The present invention relates to a simple and reliable portable apparatus and method for tracing a gas leak, particularly a fuel gas leak.

DISCUSSION OF THE BACKGROUND

Gas leak detection is an important safety issue to most oil and gas industries. In the United Kingdom there is a network of over 0.25 million kilometers of pipe. Gas leaks present a hazard across the entire gas chain, from offshore gas and oil exploration and production, through to the processing, transmission, storage and distribution of gas onshore, to its utilisation by industrial and domestic customers. Many thousands of engineers are engaged in the United Kingdom in day-to-day gas detection activities in response to typically half a million public reported escapes per year.

Conventionally Emergency Response teams are only equipped with gas detectors to locate a gas leak. When the plume of gas from a leak is detected, the engineers have to scan the area very slowly and in all directions by trial and error to find the source of the gas leak. However, such a method is time consuming and unreliable as the engineer must walk around randomly trying to find the source of the gas leak. It is an object of the present invention to provide a method and apparatus to quickly and reliably locate the source of a gas leak.

SUMMARY OF THE INVENTION

According to a first aspect of the present invention there is provided an apparatus for identifying the location of a gas leak source, the apparatus comprising a gas detector for detecting the presence of a gas and a wind direction indicator.

From the wind direction at the point where gas is detected, one can determine the direction of the source of the leaking gas. This information can be used by an engineer to locate the gas leak source. An engineer can perform more than one measurement at different locations and use the plurality of determined directions to identify the location of the gas leak source more precisely.

The apparatus is preferably portable to enable it to be moved around by an engineer to detect leaking gas. The apparatus may for example be a hand held device or may be provided on a support with one or more wheels such as a trolley.

The gas detector could detect the presence or absence of gas or could measure the concentration of any gas present.

According to a second aspect of the present invention, there is provided a method for identifying the likely location of a gas leak source, the method comprising detecting the presence of gas using a gas detector;

measuring the wind direction at the point where gas is detected using a wind direction indicator; and determining the location of a gas leak source using pipeline layout information by determining the intersection of the wind direction at the point where gas was detected and the location of a pipeline from the pipeline layout information.

Pipeline layout information which is often supplied in the form of data to be read and displayed by a computer or as a map is generally readily available to engineers and can easily be used in conjunction with information obtained from a gas detector and a wind direction detector to locate the gas leak source. If a map in the form of electronic data is used, a computing means may be used to determine the location of the gas leak source from the wind direction where gas is detected and the pipeline layout information.

According to a third aspect of the present invention there is provided a method of tracing a gas leak source location comprising a first step of detecting the presence of gas using a gas detector;

a second step of determining the wind direction at the point where gas is detected using a wind direction indicator;

a third step of moving the gas detector and wind direction indicator upwind in the determined wind direction and continuing to detect the presence of gas until the detected presence of gas starts to disappear;

a fourth step of moving the gas detector in sweeps in the directions transverse to the wind direction whilst continuing to detect for the presence of gas and if substantially no gas is detected in the transverse sweeps, the point where the detected presence of gas started to disappear is substantially the gas leak source location, or if gas is detected in the movements transverse to the wind direction, the third and fourth steps are repeated from substantially the central point where gas is detected in the transverse sweeps until no gas is detected in the latest transverse sweeps.

According to a fourth aspect of the present invention there is provided a method of tracing a gas leak source location comprising a first step of detecting the presence of gas using a gas concentration detector;

a second step of determining the wind direction at the point where gas is detected using a wind direction indicator;

a third step of moving the gas detector and wind direction indicator upwind in the determined wind direction and continuing to detect the presence of gas until the detected presence of gas starts to disappear and a fourth step of moving the gas detector in sweeps in the directions transverse to the wind direction whilst continuing to detect for the presence of gas and if no gas is detected in the transverse sweeps, the point where the detected presence of gas started to disappear is substantially the gas leak source location, or if gas is detected in the movements transverse to the wind direction, the third and fourth steps are repeated from the point with substantially the greatest detected concentration during the transverse sweeps until no gas is detected in the latest transverse sweeps.

By following the method according to the third or fourth aspects of the present invention the location of a gas leak can be found quickly and precisely without the need for pipeline layout information.

The invention is not limited to the detection of fuel gas such as natural gas. When other gas detectors are used, the invention can find broad applications in chemical refineries and storage plants and for environmental pollution monitoring purposes.

BRIEF DESCRIPTION OF THE DRAWINGS

An example of the present invention will now be described with reference to the accompanying drawings in which.

DETAILED DESCRIPTION OF PREFERRED EMBODIMENTS

Figure 1:
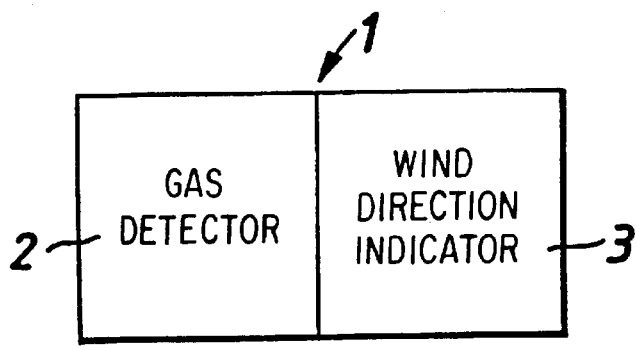
FIG. 1 diagrammatically shows an apparatus for use in the present invention.

FIG. 1 shows an apparatus 1 according to the present invention comprising a gas detector 2 and a wind direction indicator 3. The gas detector 2 could be a device for detecting and indicating varying gas concentrations or any device for detecting the presence or absence of gas. A gas concentration detector as is well known in the art could take many forms such as a device able to provide a meter reading according to the detected gas concentration and/or a device able to vary a characteristic of an audible signal such as the pitch and/or volume according to the detected gas concentration. The wind direction indicator could also take any convenient form as is well known in the art such as a rotatable vane or an ultrasonic detector.

Figure 2:
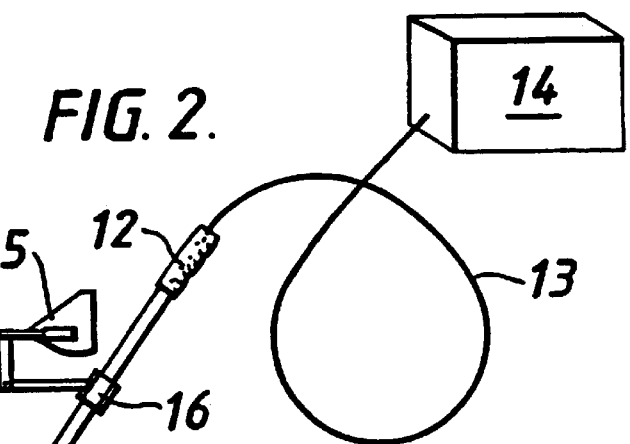
FIG. 2 shows a hand held version of the apparatus shown in FIG. 1.

FIG. 2 shows a form of the apparatus 1 which is conveniently portable. The device comprises a hand held probe 10 which in this case has a hollow elongate body with an orifice 11 at one end for test gas to enter the probe and a hand grip 12 at a second end to enable the orifice 11 of the probe 10 to be easily positioned at various possible gas leak locations. The second end of the probe is connected via a flexible hose 13 to a gas detecting device 14 for test gas to pass from the probe to the gas detector. The body of the probe 10 is provided with a wind direction detector 15 which in this case is a vane secured to the probe 10 with a bracket 16. The wind direction indicator could be provided in any suitable form such as an ultrasonic wind direction indicator sensor.

Figure 3:
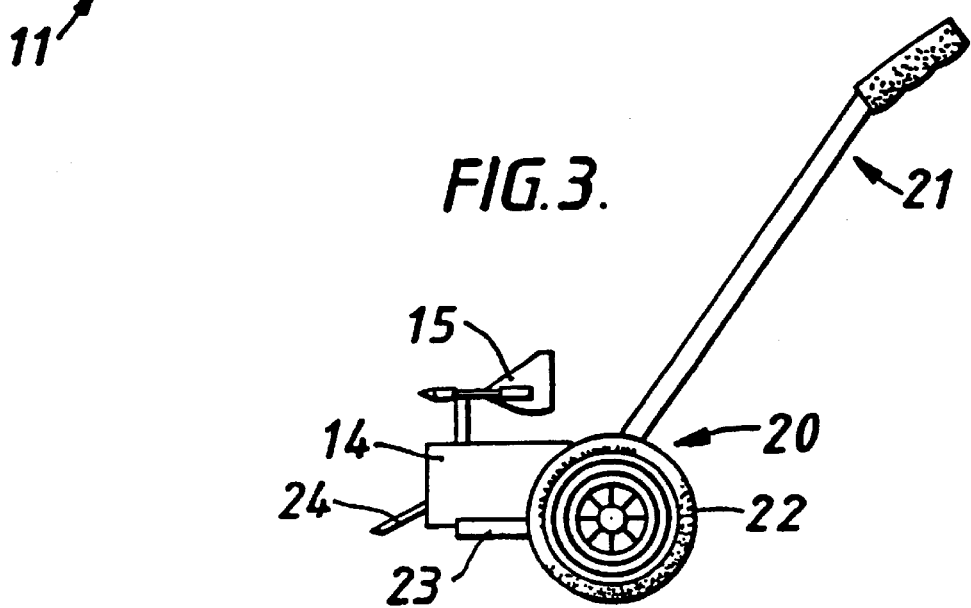
FIG. 3 shows a version of the apparatus arranged to be carried by a trolley.

FIG. 3 shows another example of a conveniently portable form of the apparatus. In this case the gas detector 14 is mounted on a trolley 20 having a handle 21, wheels 22 (only one of which is shown) and a support 23 for the gas detector 14 and wind direction indicator 15. In this example, a short rigid probe 24 is mounted directly to the gas detector 14 to receive air close to the ground.

Figure 4:
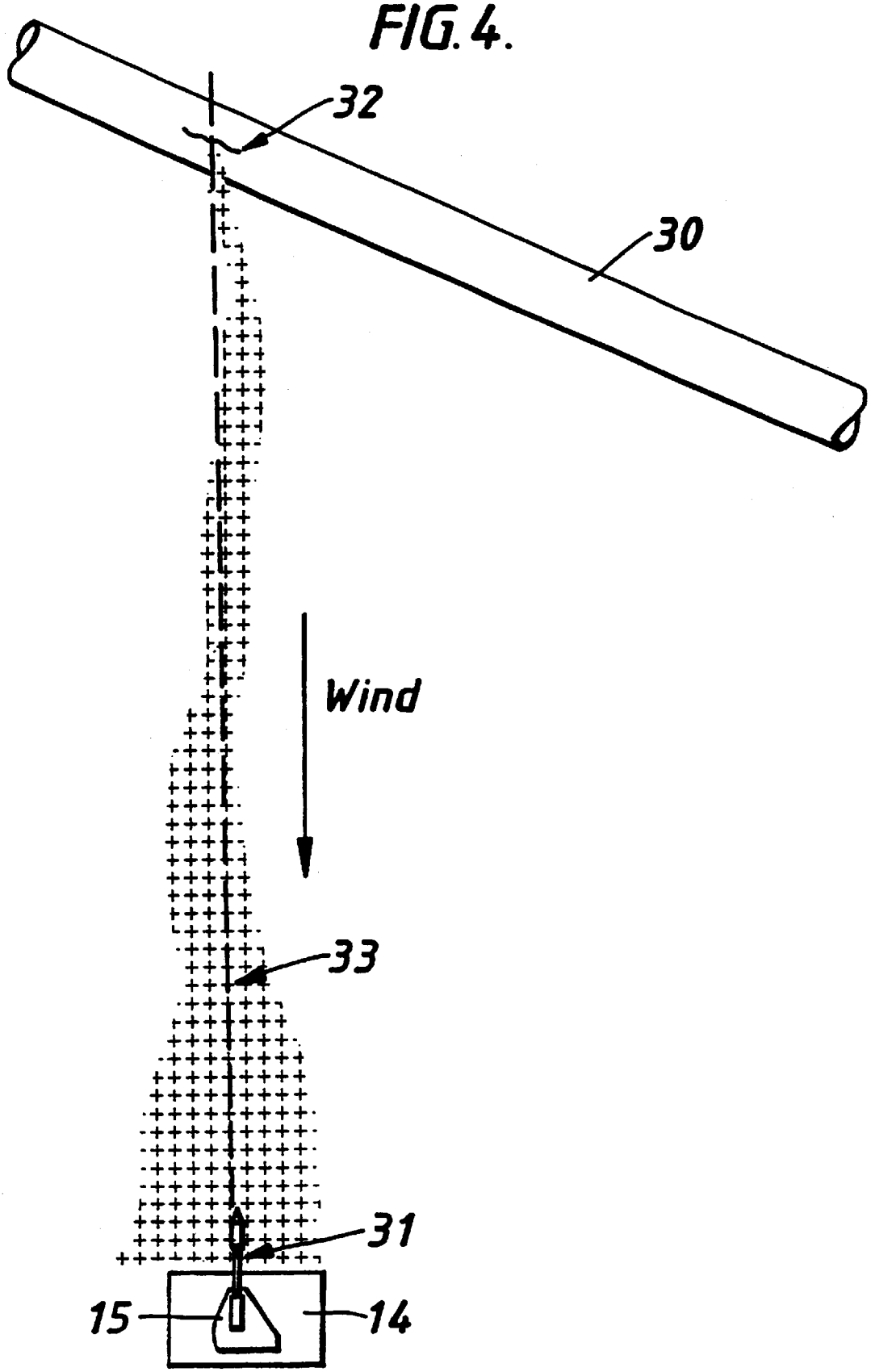
FIG. 4 illustrates the apparatus in use according to the method of the second aspect of the invention.

The apparatus comprising a gas detector and a wind direction indicator is used by an engineer to determine the direction of the source of a gas leak from the position where gas is detected. This information is preferably used in conjunction with a pipeline layout map to determine the likely position of the source of the gas leak as shown in FIG. 4. This is achieved by determining where a pipeline 30 intersects the upwind direction at the point 31 where gas is detected.

The intersection point is likely to be a leak source 32 which may be a defect, for example a crack in an exposed pipe 30, or the surface location above a defect in a subterranean pipe 30. If a gas leak occurs in a subterranean pipe, the leaking gas seeps through the ground above the pipe to the surface. Locating the source of a gas leak at a ground surface level indicates that pipework substantially directly underneath that ground surface location is leaking and needs to be repaired.

The gas generally leaks from the defect in a gas plume 33 of increasing cross-section as the distance from the leak source increases due to diffusion of the leaking gas. To take account of the increasing cross section of the plume of gas, the point at which gas is detected 31 is preferably taken to be the highest gas concentration or substantially the centre of a sweep in which gas is detected in the directions transverse to the wind direction.

If the pipeline layout information is provided as data in the form of a computerised map held in a computing means, the point at which gas is detected and the upwind direction at that point can be entered into the computing means, for example by entering appropriate co-ordinates. The computing means can then determine the intersection of one or more pipelines with the wind direction from the point at which gas was detected to provide the most likely gas leak source location.

Figure 5:
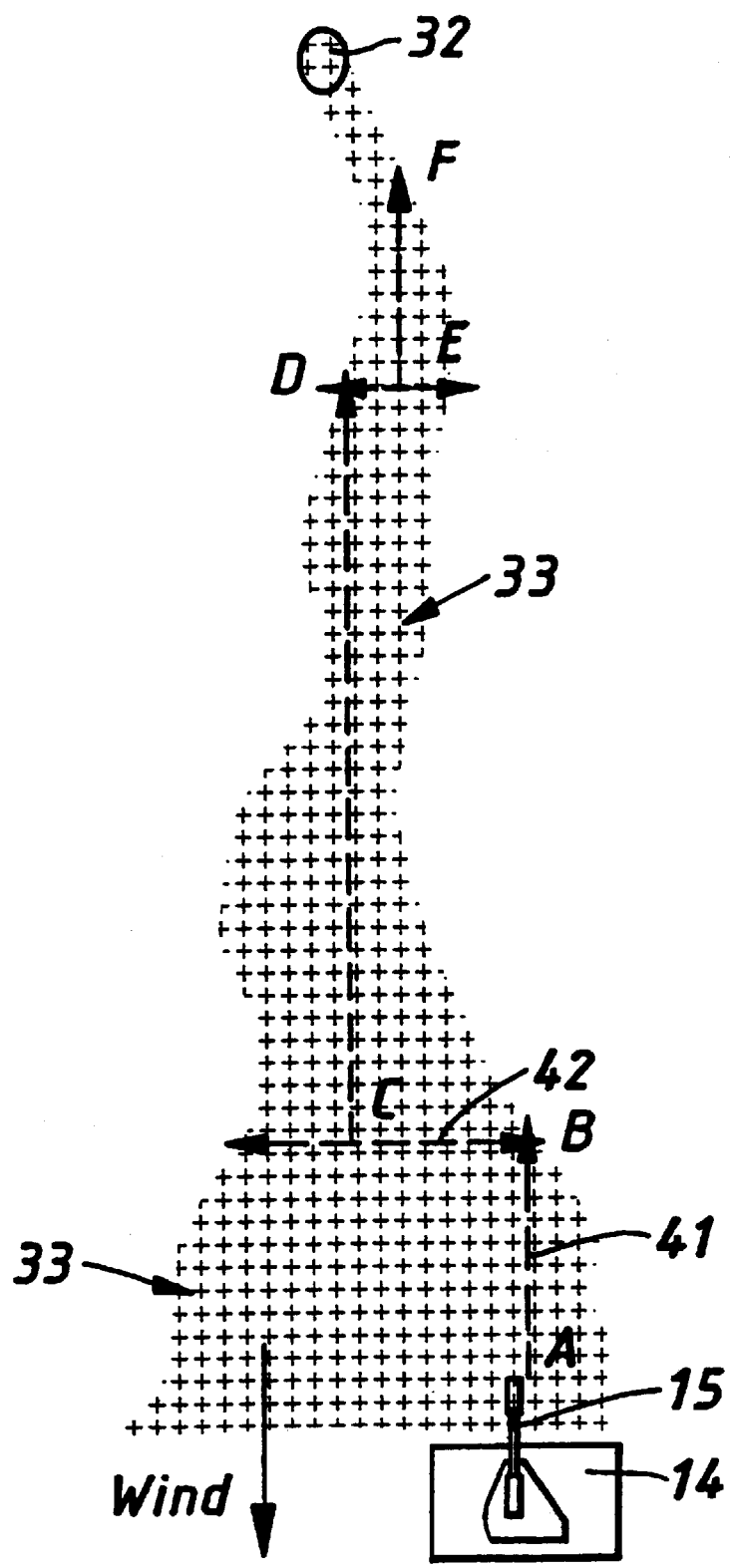
FIG. 5 illustrates the apparatus in use according to the third and fourth aspects of the invention.

FIG. 5 shows a method of determining a gas leak source location 32 preferably using a portable apparatus as described above. This method does not require information regarding the surrounding pipeline layout and takes account of the shape of the gas plume 33.

From a point A at which gas is detected, the apparatus 14, 15 is moved upwind in the detected wind direction to a point B at which if a gas presence/absence detector is used the presence of gas is no longer detected and if a gas concentration detector is used the gas concentration reading starts to disappear.

From point B the apparatus 14, 15 is moved in directions transverse to the wind direction 42 whilst detecting for the presence of gas. A point C is found which if a gas presence/absence detector is used is substantially the centre of the transverse range in which gas was detected or if a gas concentration detector is used is the strongest reading of the transverse range.

From point C the apparatus 14, 15 is again moved upwind in the detected wind direction to find point D in the same manner as point B was found as described above.

Point E is found by moving the apparatus in sweeps transverse to the wind direction starting from point D in the same manner as point C was found as described above.

From point E the apparatus 14,15 is again moved upwind in the detected wind direction to find point F in the same manner as point B was found as described above.

These alternating movements of the apparatus 14, 15 in the detected wind direction and in sweeps transverse to the wind direction are repeated until substantially no gas is detected in the sweeps transverse to the wind direction. The end point of the previous sweep in the direction of the detected wind direction is then taken to be the source of the gas leak.

Alternatively if no gas is detected from the beginning of a movement of the apparatus 14, 15 in the detected wind direction, the point detected in the previous sweep in the direction transverse to the detected wind direction may be taken to be the gas leak source location.

If a gas concentration detector arranged to vary a characteristic of an audible signal such as the pitch or volume according to the detected gas concentration is used, a user is able to trace a gas leak source very quickly.

Figure 6:
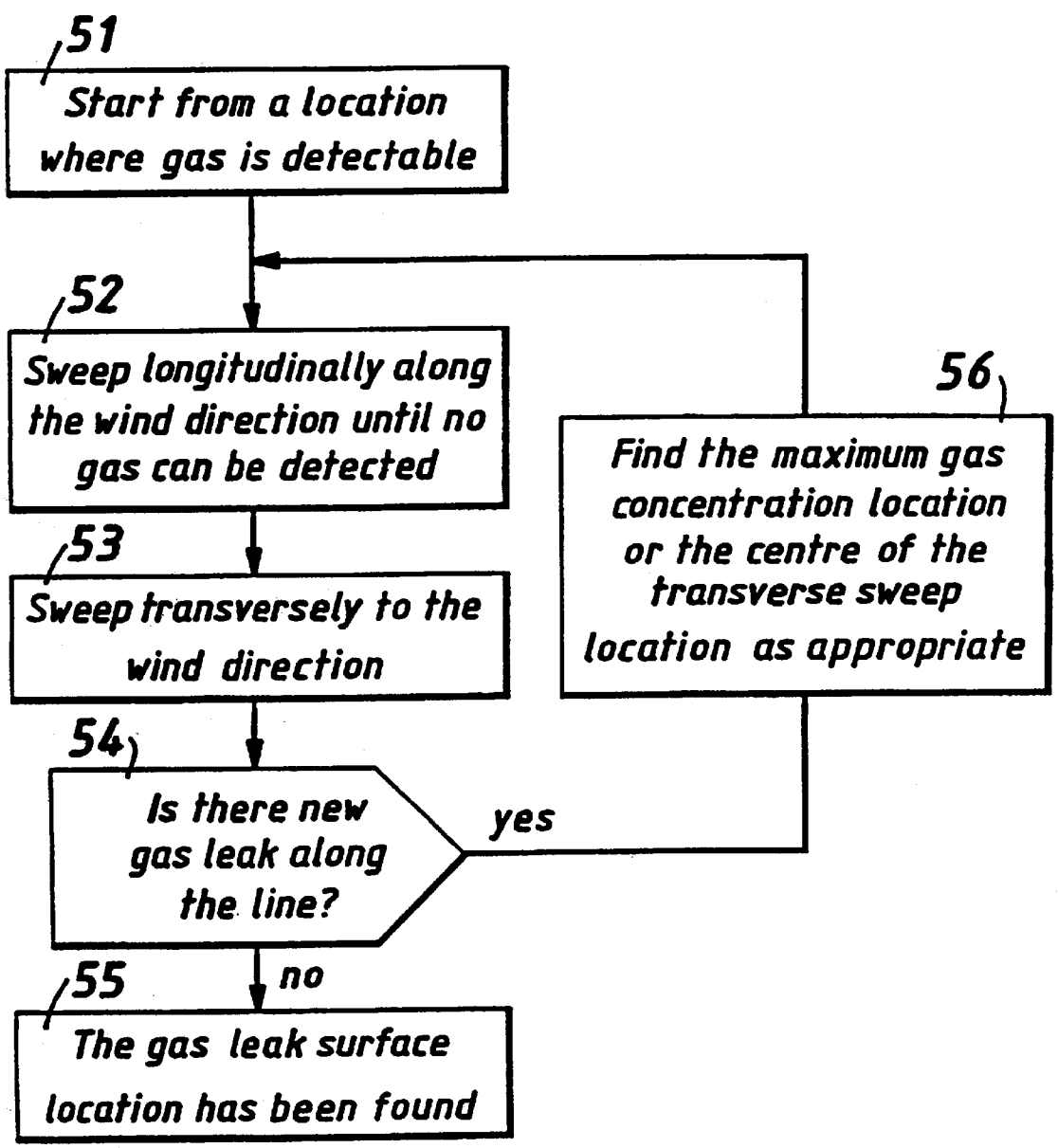
FIG. 6 is a flow diagram illustrating the gas leak tracing method of the third and fourth aspects of the invention.

FIG. 6 is a flow chart illustrating the method of tracing a gas leak source shown in FIG. 5 using an apparatus with a gas detector and a wind direction indicator.

At step 51 a location is found at which gas is detected.

At step 52 the apparatus is moved upwind in the direction of the detected wind direction until gas can no longer be detected.

At step 53 the apparatus is moved transversely to the detected wind direction.

At step 54, if no further gas is detected during the transverse movements, the flow chart proceeds to step 55 at which the point found in step 52 is determined to be the gas leak source. However, if gas is still detected during the transverse sweeps the flow chart proceeds to step 56.

At step 56 if a gas concentration detector is used the maximum gas concentration location in the transverse sweeps is found and the flow chart returns to step 52. However, if a gas presence/absence detector is used, substantially the centre of the transversely swept region in which gas is detected is found and the flow chart returns to step 52.

Thus according to the present invention a gas leak source can be found quickly and precisely.

Clearly many variations may be made to the example described above whilst still falling within the scope of the invention. For example any type of gas detector or wind direction detector may be used. The gas detector need not necessarily detect fuel gas but could detect for example a chemical or pollutant.

What is claimed is:

1. A portable apparatus and method for identifying the likely location of a gas leak source comprising a gas detector for detecting the presence of a gas and a wind direction indicator;

wherein said apparatus is arranged to detect a concentration of any gas present; and a method of identifying a gas leak source, the method compromising:

a first step of detecting the presence of gas using a gas concentration detector;

a second step of determining the wind direction at the point where gas is detected using a wind direction indicator;

a third step of moving the gas detector and wind direction indicator upwind in the determined wind direction and continuing to detect the presence of gas until the detected presence of gas starts to disappear; and a fourth step of moving the gas detector in sweeps in the directions transverse to the wind direction whilst continuing to detect for the presence of gas and if no gas is detected in the transverse sweeps, the point where the detected presence of gas started to disappear is substantially the gas leak source location, or if gas is detected in the movements transverse to the wind direction, the third and fourth steps are repeated from the point with substantially the greatest detected concentration during the transverse sweeps unit no gas is detected in the latest transverse sweeps.

2. An apparatus according to claim 1, provided on a support with at least one wheel.

3. An apparatus according to claim 1, provided as a hand held device.

4. A method of identifying the likely location of a gas leak source using an apparatus according to claim 1, the method comprising detecting the presence of a gas using the gas detector;

measuring the wind direction at the point where gas is detected using the wind direction indicator; and determining the location of a gas leak source using pipeline layout information by determining the intersection of the wind direction at the point where gas was detected and the location of a pipeline from the pipeline layout information.

5. A method according to claim 4, wherein the pipeline layout information is provided as data to be read by a computing means.

6. A method according to claim 5, wherein the location at which gas is detected and the wind direction at that point is arranged to be entered into the computing means which is arranged to determine the intersection of the wind direction from where gas was detected and one or more pipelines to identify the likely location of a gas leak.

7. A method according to claim 1, wherein if substantially no gas is detected from the beginning of a movement of the gas detector and the wind direction indicator upwind in the determined wind direction, the point detected in the previous sweep in the directions transverse to the detected wind direction is taken to be substantially the gas leak source location.

8. An apparatus according to claim 2 wherein the gas detector is arranged to detect the presence or absence of gas.

9. An apparatus according to claim 3 wherein the gas detector is arranged to detect the presence or absence of gas.

10. An apparatus according to claim 2 wherein the gas detector is arranged to detect the concentration of any gas present.

11. An apparatus according to claim 3 wherein the gas detector is arranged to detect the concentration of any gas present.

12. A method of tracing a gas leak source location using a portable apparatus comprising a gas detector arranged to detect presence or absence of a gas and a wind direction indicator, the method comprising:

detecting the presence of the gas using the gas detector;

determining a wind direction at a point where the gas is detected using the wind direction indicator;

first moving the portable apparatus including the gas detector and the wind direction indicator upwind in the determined wind direction and continuing to detect the presence of gas until the detected presence of gas starts to disappear;

second moving the gas detector in transverse sweeps in a transverse wind direction while continuing to detect for the presence of gas, and if substantially no gas is detected in the transverse sweeps, a point where the detected presence of gas started to disappear is substantially the gas leak source location, or if gas is detected in the transverse sweeps, repeating the first and second moving steps from substantially a central point where the gas is detected in the transverse sweeps until no gas is detected in at least a latest transverse sweep.

13. A method of tracing a gas leak source location using a portable apparatus comprising a gas detector arranged to detect concentration of a gas and a wind direction indicator, the method comprising:

detecting a presence of the gas using the gas concentration detector;

determining a wind direction at a point where gas is detected using the wind direction indicator;

first moving the gas detector and wind direction indicator upwind in the determined wind direction and continuing to detect the presence of gas until the detected presence of gas starts to disappear; and second moving the gas detector in transverse sweeps in directions transverse to the wind direction while continuing to detect for the presence of gas, and if no gas is detected in the transverse sweeps, a point where the detected presence of gas started to disappear is substantially the gas leak source location, or if gas is detected in the transverse to sweeps, repeating the first and second moving steps from a point with substantially a greatest detected concentration during the transverse sweeps until no gas is detected in at least a latest transverse sweep.

14. A method according to claim 13, wherein if substantially no gas is detected from a beginning of said first moving step, a point detected in a previous sweep in the directions transverse to the detected wind direction is taken to be substantially the gas leak source location.

15. A method of identifying a likely location of a gas leak source using a apparatus comprising a gas detector for detecting a presence of a gas and a wind direction indicator, the method comprising:
   detecting the presence of the gas using the gas detector;
   measuring a wind direction at a point where the gas is detected using the wind direction indicator; and
   determining a location of a gas leak source using pipeline layout information by determining an intersection of the wind direction at a point where the gas was detected and a location of a pipeline from pipeline layout information.

16. A method according to claim 15, wherein the pipeline layout information is provided as data to be read by a computing means.

17. A method according to claim 16, wherein the location at which the gas is detected is configured to be entered into the computing means, which is configured to determine the intersection of the wind direction from where the gas was detected and one or more pipelines to identify the likely location of the gas leak.

18. A portable apparatus and method for identifying the likely location of a gas leak source comprising a gas detector for detecting the presence of a gas and a wind direction indicator;
   wherein the gas detector is arranged to detect the presence or absence of gas; and
   a method of tracing a gas leak source location using said apparatus, the method comprising:
      a first step of detecting the presence of a gas using a gas detector;
      a second step of the wind direction at the point where the gas is detected using a wind direction indicator;
      a third step of moving the gas detector and wind direction indicator upwind in the determined wind direction and continuing to detect the presence of gas until the detected presence of gas starts to disappear;
      a fourth step of moving the gas detector in sweeps in the directions transverse to the wind direction while continuing to detect for the presence of gas and if substantially no gas is detected in the transverse sweeps, the point where the detected presence of gas started to disappear is substantially the gas leak source location, or if gas is detected in the movements transverse to the wind direction, the third and fourth steps are repeated from substantially the central point where the gas is detected in the transverse sweeps until no gas is detected in the latest transverse sweeps.

19. An apparatus according to claim 18, provided on a support with at least one wheel.

20. An apparatus according to claim 18, provided as hand held device.

21. A method of identifying the likely location of a gas leak source using an apparatus according to claim 18, the method comprising:
   detecting the presence of a gas using a gas detector;
   measuring the wind direction at the point where gas is detected using the wind direction indicator; and
   detaining the location of a gas leak source using pipeline layout information by determining the intersection of the wind direction at the point where the gas was detected and the location of a pipeline from the pipeline layout information.

22. A method according to claim 21, wherein the pipeline layout information is provided as data to be read by a computing means.

23. A method according to claim 22, wherein the location at which gas is detected and the wind direction at that point is arranged to be entered into the computing means which is arranged to determine the intersection of the wind direction from where gas was detected and one or more pipelines to identify the likely location of a gas leak.

24. An apparatus according to claim 18, wherein the gas detector is arranged to detect the presence or absence of gas.

25. An apparatus according to claim 20, wherein the gas detector is arranged to detect the presence or absence of gas.

26. An apparatus according to claim 19, wherein the gas detector is arranged to detect the concentration of any gas present.

27. An apparatus according to claim 20, wherein the gas detector is arranged to detect the concentration of any gas present.

* * * * *